(No Model.)
T. H. SIMMONDS.
STEERING GEAR FOR VELOCIPEDES.
No. 587,872. Patented Aug. 10, 1897.
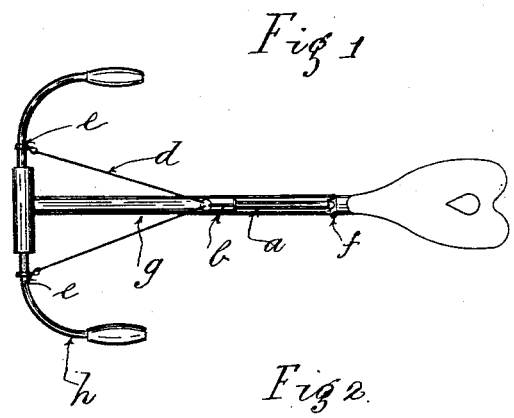
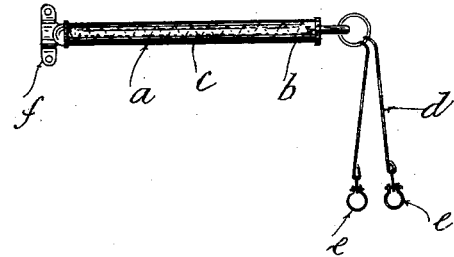
Witnesses
Benjamin Clark
James Fleming
Inventor
Thomas Henry Simmonds
per E. Caton
His Attorney

UNITED STATES PATENT OFFICE.

THOMAS HENRY SIMMONDS, OF LONDON, ENGLAND.

STEERING-GEAR FOR VELOCIPEDES.

SPECIFICATION forming part of Letters Patent No. 587,872, dated August 10, 1897.

Application filed August 28, 1896. Serial No. 604,183. (No model.)

*To all whom it may concern:*

Be it known that I, THOMAS HENRY SIMMONDS, a subject of the Queen of Great Britain, and a resident of London, England, have invented certain new and useful Improvements in Steering-Gear for Velocipedes, of which the following is a full, clear, and exact specification.

This invention relates to steering devices for bicycles and the like, and aims to provide a simple and effective means of steering which shall not interfere with the ordinary steering of the machine, and the same is carried out as follows, reference being had to the annexed drawings, in which—

Figure 1 is a plan view showing my invention in position; Fig. 2, enlarged view of the steerer removed.

$a$ is a cylinder which contains the spiral spring $c$ or other suitable elastic material, which acts upon the piston or rod $b$, which is attached to the cords $d\ d$ by any suitable connection, such as the ring $i$. The cylinder or casing $a$ is secured to the frame $g$ of the machine, at a suitable part thereof, by means of the clip $f$, which is pivotally or movably connected to the cylinder $a$ at $d'$.

$e\ e$ are clips which are attached to the cords $d$ and grip the handle-bar $h$ of the machine and, owing to the action of the spring $c$, will tend to keep the front or steering wheel of the machine in the desired direction, at the same time allowing the handle-bars to be moved when required.

Of course it will be readily seen that although I have shown a casing containing a spring for operating upon the cords $d$ there are several forms of spring which may be employed in conjunction with the two cords $d$, which, being secured one on either side of the handle-bar axis, tend to maintain same in the required position.

Having thus described my invention, what I claim, and desire to secure by Letters Patent, is—

In steering-gear for bicycles in combination, two cords secured to the handle-bar, one on each side of the axis of same, by means of clips, a regulating-spring carried in a cylinder or casing, a piston or rod in said cylinder or casing acted upon by the said spring and connected to said cords, a pivot or swivel-joint for attaching said casing to the frame of the machine.

In testimony that I claim the foregoing I have hereunto set my hand this 24th day of July, 1896.

THOMAS HENRY SIMMONDS.

Witnesses:
WM. JOHN WEEKS,
H. D. HOSKINS.